United States Patent Office 3,257,376
Patented June 21, 1966

3,257,376
SEPARATION OF COMPOUNDS
Dean P. Montgomery, Bartlesville, Okla., assignor to Phillips Petroleum Company, a corporation of Delaware
No Drawing. Filed Oct. 15, 1962, Ser. No. 230,752
9 Claims. (Cl. 260—96.5)

This invention relates to separation of organic compounds. In one of its aspects, the invention relates to separation of polynuclear compounds of linear heterocyclic and limited dimension kata-condensed polynuclear compounds by thiourea adduction. In another aspect, the invention relates to separation of polynuclear compounds of the types linear heterocyclic and limited dimension kata-condensed aromatics and terminally alkylated derivatives thereof from other compounds by thiourea adduction, and to the adducts thus formed.

There has recently been discovered a process for the separation of organic compounds, which process permits the separation of a class of compounds having one type of molecular arrangement from a class of compounds having a different molecular arrangement. The mixtures to which the present invention applies can be naturally occurring mixtures or those obtained during synthesis processes, or any combination thereof. The process is especially applicable to separation of petroleum fractions and coal tars, but can also be utilized in the purification of mixtures, aromatization and cracking products and other mixtures which require purification or fractionation. Thiourea adducts of cycloparaffins, such as cyclohexane, methylcyclopentane, and Decalin, are well known, as also are the thiourea adducts of branched, open chain paraffins.

It is an object of this invention to provide a novel method of separating organic compounds. It is another object of this invention to provide a novel method for the separation of polynuclear organic compounds of the types linear heterocyclic and limited dimension kata-condensed aromatics and terminally alkylated derivatives thereof from less strongly adducted compounds by thiourea adduction, and to provide the novel solid adducts thereof.

Other aspects, objects and the several advantages of this invention will become apparent to one skilled in the art upon study of this disclosure and the appended claims.

According to the invention, I have discovered a method for separating a compound selected from the group consisting of

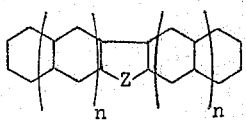 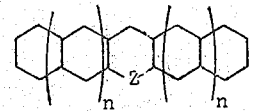

angularly kata-condensed polynuclear aromatics of the type hereinafter referred to as "type 2," and certain terminally alkylated derivatives thereof wherein Z is selected from the group consisting of —CH$_2$—, —O—, —S—

$$\overset{H}{\underset{|}{-N-}}$$

and =N— from a mixture containing it along with another compound which comprises contacting said mixture with thiourea for a time sufficient to form a solid adduct, separating said solid adduct from said mixture, and decomposing said solid adduct to recover said compound.

It has been found that polynuclear compounds having the following structural formulas form thiourea adducts.

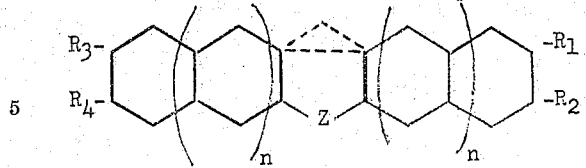

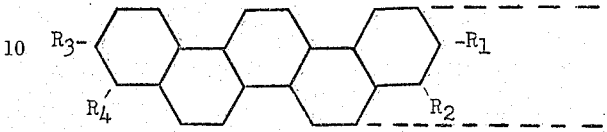

The following preferred limitations aply to the generalized formulas shown:

(1) In type 1 compounds, each $n$ can be 0, 1 or 2; the ring containing —Z— can be either five-membered or six-membered, and the substituent Z can be CH$_2$, oxygen (furane or pyrylium ring), sulfur (thiophene or thiapyrylium ring), or nitrogen (pyrrole, pyrrolenine, or pyridine ring). In the case of the nitrogen-containing rings, only one additional atom can be attached to the nitrogen atom. Simple, non-limiting examples of type 1 ring systems are:

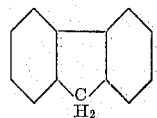 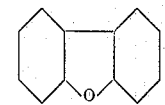

Fluorene        Dibenzofurane

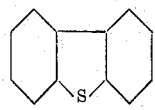 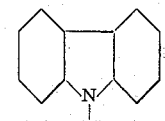

Dibenzothiophene    Dibenzopyrrole (2) In type 2 compounds, linear and angular ring fusion of the six-membered rings alternate as shown, and can continue to be total of 3, 4, 5, 6, 7, or 8 rings. This alternation of linear and angular ring fusion is dictated by dimension indicated by the dashed lines, which is much more apparent in molecular models constructed from Fisher-Taylor-Hirschfelder units. Both linear and angular fusion are covered by the term "kata-condensation," in which each additional condensed ring contributes four additional carbon atoms, in contrast with "peri-condensation," in which each additional ring contributes three or fewer carbon atoms. These two types of condensations are discussed in "Aspects of the Constitution of Mineral Oils," by Van Nes and Van Westen, Elsevier, 1951, page 94. Simple, non-limiting examples of type 2 ring systems are:

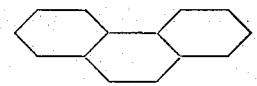

Phenanthrene

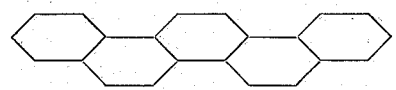

Picene (3) With the exception that there must be at least one alkyl substituent, the groups R$_1$, R$_2$, R$_3$, and R$_4$ can be:
(a) Any combination of hydrogen and methyl groups (i.e., all methyl, three hydrogen plus one methyl, etc.).

(b) Any combination of hydrogen and methyl groups except that one group from either or both pairs $R_1$–$R_2$ and $R_3$–$R_4$ can be an alkyl group containing 2 to 10, preferably 2 to 5, carbon atoms.

(4) In type 2 compounds, substitution on the terminal rings must be on the carbon atoms such that the substituent lies within the limits defined by the dashed lines in the generalized formula.

Consideration of Fisher-Taylor-Hirschfelder molecular models reveals that the actual critical cross-sectional dimension of phenanthrene exceeds that of linearly fused rings by only 0.6 A. (8.3 and 7.7 A., respectively). The same dimensional relation is found for only similarly fused molecules such as chrysene and picene. Alkylation of phenanthrene in positions 1, 2, 7, and 8 does not change the value of this critical dimension.

The present process is practiced by (1) contacting a mixture containing the adducting aromatic compound or compounds with a solution or slurry of thiourea for a sufficient length of time to form the adduct,
(2) separating the solid adduct from the unreacted compounds,
(3) decomposing the separated adduct, and
(4) recovering the adducted compounds from the decomposition product.

The mixture charged to the contacting step is preferably an aromatic concentrate, such as an aromatic extract oil; and, for maximum product purity and yield, a relatively narrow boiling range cut is desirable. The mixture is contacted with the thiourea solution or slurry in conventional mixing equipment. As the formation of the adduct is a matter of chemical equilibrium, a relatively large amount of thiourea is desirable for maximum yield of product.

The solid adduct formed in the contacting step can be recovered from the non-adducted compounds by various methods, such as filtration, decanting, centrifuging, etc. The separated solids are preferably washed to remove adhering non-adducted compounds, the wash solvent being, e.g., a non-adducting hydrocarbon such as n-hexane, n-heptane, n-octane, or benzene, which can readily be separated from the aromatic compounds by fractionation because of the large difference in boiling points.

The separated adduct is then decomposed preferably by addition of water in sufficient amounts to dissolve the thiourea, thus destroying the adduct and freeing the adducted compounds. The compounds can then be separated by decantation or other suitable means. Numerous other methods for decomposing the adducts and recovering the adducted product are known in the prior art and any of these methods which are suitable can be used. When the above adduct decomposition step is used, addition of a low boiling, non-adducting hydrocarbon such as benzene to lower the density of the phase containing the adducted compounds will facilitate separation of the two phases. Washing the separated adducted compounds with additional water several times removes the last traces of thiourea. Product recovery is completed by removal of the diluent hydrocarbon from the product by distillation.

The thiourea solutions and slurries used in the contacting step are of the same type used in the prior art processes for adduction of branched paraffins and cycloparaffins. The solvents for the thiourea can be methanol, ethanol, acetone, etc. The concentration of thiourea can be from about one weight percent through saturated solutions and slurries of solid thiourea in saturated thiourea solutions. The thiourea is ordinarily employed in amount from 4 to 100 mols/mol of adductable aromatic, preferably from 6 to 25 mols/mol of adductable aromatic. The adducting reaction can be effected using alcohol or other thiourea solvent in quantities such that only a single liquid phase is present, or larger quantities can be employed whereby a separate solvent phase is present.

The adducting can be carried out under the following conditions:

|  | Broad | Preferred |
|---|---|---|
| Temperature, °F | 40–350 | 50–150. |
| Contact time | 5 min., 24 hrs | 10 min., 8 hrs. |

The length of time required to effect the adduct formation depends on the efficiency of mixing, more efficient mixing decreasing the required time. The lower limit on the temperature is actually only a practical limit because of thiourea solubility.

Complete separation of adducting and certain non-adducting aromatics is not possible under all conditions due to an effect known as "inclusion." It has been found that compounds such as 2-methylnaphthalene will not form adducts with thiourea, but some of such materials can be included in the adduct formed by other materials. Compounds such as 1,4-dimethylnaphthalene, too large in one dimension to enter the adduct channel, are substantially completely eliminated from the adduct. However, substantial concentration of the adducting components is effected.

Obviously, a strongly adducting component can also be concentrated in the presence of a less strongly adducting component giving a superficial appearance of non-adduction of the less strongly adducting component. This effect is actually an effect of equilibrium.

The solid adduct products formed by the method of this invention find utility as convenient sources of the compound adducted, since the solid adduct is readily decomposed.

EXAMPLE I

A thiourea adduct was formed by adding a benzene solution containing 2,3,6-trimethylnaphthalene (0.13 gram/milliliter) and equal concentrations of 2- and 3-methylphenanthrenes (0.083 gram/milliliter of each) to methanol saturated with thiourea. The solid product obtained was filtered to dryness and decomposed. Gas chromatographic and infrared analyses showed that the hydrocarbon recovered from the adduct contained 2-methylphenanthrene (type 2), 2,3,6-trimethylnaphthalene, and only a small quantity of 3-methylphenanthrene. This test illustrates the criticalness of the limitations indicated by the dashed lines in the type 2 general formula of the present disclosure. From this experiment, it was concluded that the phenanthrenes of the cycle oil adductate are alkylated in any of positions 1, 2, 7, and 8, or in combination of these positions.

EXAMPLE II

Separation of an extract oil

A 500–700° F. distillate was prepared by fractional distillation of a sulfur dioxide extract oil. Three volumes of dimethyl sulfoxide per volume of distillate were used, at 180° F., to extract further the aromatic components of the cycle oil. The resultant concentrate contained only two percent of saturated components. A portion of this concentrate was divided into two fractions, that which formed an adduct with thiourea and that which remained.

Preparation of thiourea adductate

A system composed of 1001.5 grams of the aromatic concentrate, 500 grams of granulated thiourea, 100 ml. of methanol and 40 ml. of benzene was stirred overnight. The viscosity of the thickened mixture was reduced by the addition of 60 ml. of methanol and 40 ml. of benzene; a 15 minute period of rapid stirring followed. Full power was applied to a Premier Dispersator during this 15 minutes and a rise in reactant temperature was observed. However, this increased temperature was calculated to be equivalent to the mechanical energy supplied by the stirrer.

The solids were filtered dry and twice slurried and filtered from a minimum quantity of benzene. Decomposition of the dry filter cake was accomplished by dissolution in a mixture of benzene and hot water. Separation and repeated water washing of the benzene phase followed, after which the benzene was removed by evaporation. The weight of the final adductate was 238.9 grams, or 23.9 weight percent.

The properties of the regenerated adductate and adduction residue are set forth in the following Table I.

TABLE I.—PROPERTIES OF THE THIOUREA ADDUCTATE AND ADDUCTION RESIDUE PREPARED FROM A 500–700° F. AROMATIC CONCENTRATE OF CYCLE OIL

| Property | Adductate | Residue |
| --- | --- | --- |
| Mol wt | 211 | 218 |
| C, wt. percent | 89.2 | 89.3 |
| H, wt. percent | 7.3 | 7.7 |
| S, wt. percent | 2.79 | 1.88 |
| N, wt. percent | 0.13 | 0.13 |
| O, wt. percent (by difference) | 0.6 | 1.0 |
| Proton distribution by nuclear magnetic resonance: | | |
| Aromatic | 44.2 | 38.1 |
| Branched methylene, $\alpha$ to aromatic ring | 1.4 | 1.2 |
| Methylene, $\alpha$ to aromatic ring | 4.7 | 5.3 |
| Methyl, $\alpha$ to aromatic ring | 33.1 | 33.0 |
| Methylene | 11.7 | 15.3 |
| Methyl | 4.9 | 7.1 |

Using the elemental analyses, molecular weights, and nuclear magnetic resonance spectra, structural details for the adductate and residue were calculated. The results are summarized in Tables II and III.

TABLE II.—CARBON DISTRIBUTION AND DERIVED MOLECULAR STRUCTURE FOR THE ADDUCTATE AND ADDUCTION RESIDUE

| | Adductate | Residue |
| --- | --- | --- |
| Percentage of carbon as— | | |
| Non-substituted aromatic ring atoms | 43.1 | 39.2 |
| Substituted aromatic ring atoms | 14.4 | 15.3 |
| Ring fusion atoms | 20.9 | 20.0 |
| Methyl alkyl atoms | 10.8 | 11.3 |
| Non-methyl alkyl atoms | 10.9 | 14.2 |
| Ratio of ring fusion carbon atoms to total ring carbon atoms [1] | 0.266 | 0.268 |
| Ratio of alkylated ring carbon atoms to non-fused carbon atoms of rings | 0.25 | 0.28 |
| Wt. percent oil oxidizable to $CO_2$, as carbon | 6.52 | 9.36 |
| Ratio of methyl to non-methyl alkyls | 6.8 | 4.6 |
| Ratio of methyl carbon atoms to total alkyl carbon atoms | 0.50 | 0.44 |
| Average number of carbon atoms per non-methyl alkyl | 5.6 | 5.2 |
| Number of alkyl carbon atoms per mol | 3.41 | 4.16 |
| Theoretical wt. percent recoverable as aromatic acids | 118 | 119 |
| Theoretical wt. percent recoverable as dealkylated cyclics | 77.9 | 73.5 |
| Theoretical wt. percent sulfur in dealkylated cyclics | 3.58 | 2.56 |
| Theoretical wt. percent oxygen in dealkylated cyclics | 0.77 | 1.36 |

[1] Includes alkylated atoms bonded to sulfur, oxygen or nitrogen.

TABLE III.—COMPOSITION OF ADDUCTATE AND ADDUCTION RESIDUE FROM A 500–700°F. AROMATIC CONCENTRATE

| Component | Weight Percent | |
| --- | --- | --- |
| | Adductate | Adduction Residue |
| Naphthalenes | 12.4 | 24.1 |
| Diphenyls | 0.9 | 1.7 |
| Dibenzofurans | 4.1 | 5.2 |
| Dibenzothiophenes | 21.3 | 12.9 |
| Phenanthrenes | 34.2 | 38.7 |
| Fluorenes | 10.4 | 13.1 |
| Anthracenes | 15.7 | 2.1 |
| Unknowns | 1.0 | 2.2 |

The data of Table III indicate that all the ring systems of this application and of my copending application, Serial No. 135,769, are adducted. The differences in amount adducted in each instance, as indicated by the relative concentration in the adductate and adduction residue, is an indication of the alkylation or lack of alkylation at the proper location(s) to permit adduction. For example, about two-thirds of the alkylanthracenes and one-third of the akyldibenzothiophenes of the concentrate were exclusively beta-alkylated and consequently form adducts with thiourea. Similarly, about a fifth of the phenanthrenes were alkylated in the 1, 2, 7, and 8 positions and thus were thiourea-adductable.

The foregoing specific examples serve to more fully illustrate my invention.

Reasonable variation and modification are possible within the scope of this disclosure and the appended claims to the invention, the essence of which is that there has been provided a method for separation of polynuclear compounds of the types linear heterocyclic and limited dimension kata-condensed aromatics from less strongly adducted compounds by thiourea, adduction, and novel adducts thereof.

I claim:

1. A method for separating a polynuclear compound selected from the group consisting of

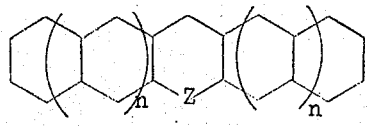

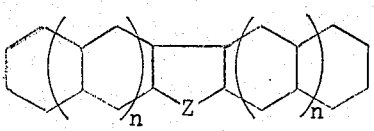

angularly-fused kata-condensed aromatic polynuclear compounds of 3–8 nuclei, and terminally-alkylated derivatives of said polynuclear compounds, wherein $n$ is from 0 to 2 and Z is selected from the group consisting of —$CH_2$—, —O—, —S—, —N—, and

from a mixture containing it along with at least one other compound having a weaker tendency to form an adduct with thiourea which comprises contacting said mixture with thiourea for a time sufficient to form a solid adduct, separating said solid adduct from said mixture, and decomposing said solid adduct to recover said compound.

2. A method of separating a polynuclear compound selected from the group consisting of

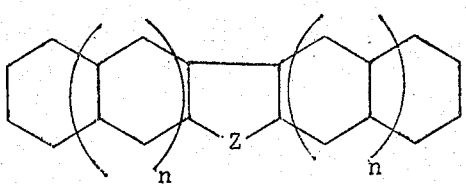

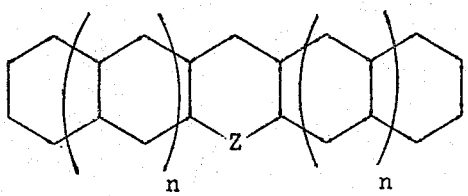

angularly-fused kata-condensed aromatic polynuclear compounds of 3–8 nuclei, and terminally-alkylated derivatives of said polynuclear compounds, wherein the terminal alkyl groups are selected from methyl and, at most, one alkyl of 2–10 carbon atoms, $n$ is from 0–2, and Z is selected from the group consisting of —CH$_2$—, —O—, —S—, —N=, and $$-\overset{H}{\underset{|}{N}}-$$

from a mixture containing it along with at least one other compound having a weaker tendency to form an adduct with thiourea which comprises contacting said mixture with thiourea in a solvent therefor for a time sufficient to form a solid adduct, separating said solid adduct from said mixture, and decomposing said solid adduct to recover said compound.

3. The method of claim 2 wherein said angularly-fused kata-condensed compound contains 3 nuclei and wherein there is a methyl in the 2 position.

4. The method of claim 2 wherein said mixture comprises
naphthalene,
dibenzofurane,
dibenzothiophene,
phenanthrene, and
fluorene.

5. The method of claim 2 wherein said mixture comprises
2,3,6-trimethylnaphthalene,
2-methylphenanthrene, and
3-methylphenanthrene.

6. The method of claim 2 wherein said mixture is an aromatic extract oil having a boiling range of 500–700° F. and which mixture comprises
naphthalenes,
diphenyls,
dibenzofurans,
dibenzothiophenes,
phenanthrenes,
fluorenes, and
anthracenes.

7. A method for separating 2,3,6-trimethylnaphthalene and 2-methylphenanthrene from a mixture of 2,3,6-trimethylnaphthalene, 2-methylphenanthrene and 3-methylphenanthrene comprising:
(1) forming a benzene solution of the said compounds;
(2) adding the solution of (1) to a saturated methanol solution of thiourea to obtain a solid product;
(3) filtering the said solid product to dryness; and
(4) decomposing the said filtered solid product to obtain 2-methylphenanthrene and 2,3,6-methylnaphthalene.

8. An adduct formed by contacting a polynuclear compound selected from the group consisting of

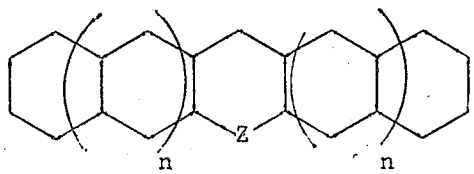

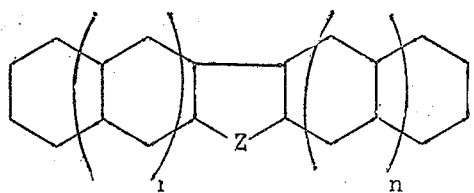

angularly-fused kata-condensed aromatic polynuclear compounds of 3–8 nuclei, and terminally-alkylated derivatives of said polynuclear compounds, where $n$ is from 0 to 2 and Z is selected from the group consisting of —CH$_2$—, —O—, —S—, —N—, and $$=\overset{H}{\underset{|}{N}}-$$

with thiourea for a time sufficient to form a solid adduct.

9. A method for separating an aromatic polynuclear compound selected from the group consisting of

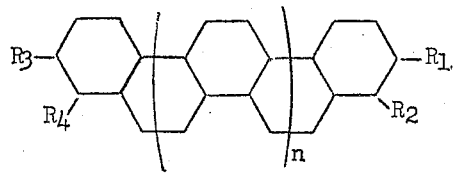

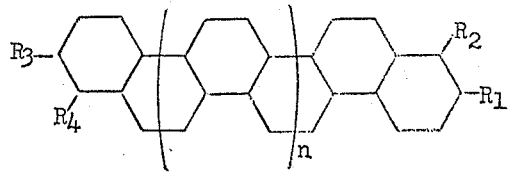

wherein $n$ is 0 to 2 and $R_1$, $R_2$, $R_3$ and $R_4$ are selected from the group consisting of hydrogen, methyl and at most one alkyl having 2–10 carbon atoms; from a mixture containing at least one said polynuclear compound and at least one other compound having a weaker tendency to form an adduct with thiourea comprising
(1) contacting said mixture with thiourea for a time sufficient to form a solid adduct;
(2) separating said solid adduct from said mixture; and
(3) decomposing said solid adduct to recover said polynuclear compound.

References Cited by the Examiner
UNITED STATES PATENTS 2,520,716  8/1950  Fetterly _____ 260—96.5
3,164,579  1/1965  Thomas _____ 260—96.5

OTHER REFERENCES

Schlenk: Jr. Analen der Chemie, Justus Liebig's, vol. 573 (1951), pages 142, 152, 159.
Swern: Ind. and Eng. Chem., vol. 47 (1955), pp. 216–21.
Truter: Research (London), vol. 6 (1953), pp. 320–26.

NICHOLAS S. RIZZO, *Primary Examiner.*

JOHN RANDOLPH, *Examiner.*